(12) United States Patent
Weikard et al.

(10) Patent No.: US 7,553,906 B2
(45) Date of Patent: Jun. 30, 2009

(54) DUAL CURE SYSTEMS

(75) Inventors: Jan Weikard, Odenthal (DE);
Christoph Gürtler, Köln (DE);
Wolfgang Fischer, Meerbusch (DE);
Diethelm Rappen, Rheinberg (DE);
Michael Schelhaas, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 732 days.

(21) Appl. No.: 10/738,879

(22) Filed: Dec. 17, 2003

(65) Prior Publication Data
US 2004/0132909 A1   Jul. 8, 2004

(30) Foreign Application Priority Data
Dec. 20, 2002   (DE) ............................... 102 60 269

(51) Int. Cl.
*C08G 18/80* (2006.01)
*C08G 18/81* (2006.01)
*C08L 75/14* (2006.01)
*C07C 233/57* (2006.01)
*C07C 263/00* (2006.01)

(52) U.S. Cl. ............... 525/174; 252/182.2; 252/182.21; 252/182.22; 428/413.1; 522/90; 522/96; 522/97; 522/174; 525/455; 526/309; 526/312; 528/45; 528/75; 560/25; 560/26; 560/115; 560/157; 560/158; 560/166

(58) Field of Classification Search ............... 252/182.2, 252/182.21, 182.22; 428/413.1; 522/90, 522/96, 97, 174; 525/124, 455; 560/25, 560/26, 115, 157, 158, 166; 564/123, 152, 564/189, 191; 526/309, 312; 528/45, 75
See application file for complete search history.

(56) References Cited

U.S. PATENT DOCUMENTS

| | | | |
|---|---|---|---|
| 4,108,814 A | 8/1978 | Reiff et al. ............ 260/29.2 TN |
| 4,485,226 A | 11/1984 | Noll et al. ...................... 528/45 |
| 4,961,960 A | 10/1990 | Iimure ...................... 427/54.1 |
| 6,060,573 A | 5/2000 | König et al. .................. 528/45 |
| 6,465,539 B1 | 10/2002 | Weikard et al. ............... 522/90 |
| 6,827,875 B2 * | 12/2004 | Schelhaas et al. ........ 252/182.2 |
| 6,843,933 B2 * | 1/2005 | Schelhaas et al. ........ 252/182.2 |
| 7,057,003 B2 * | 6/2006 | Detig-Karlou et al. ........ 528/45 |
| 7,148,374 B2 * | 12/2006 | Greszta-Franz et al. ..... 560/330 |
| 7,220,814 B2 * | 5/2007 | Rische et al. ................. 528/45 |
| 2002/0198314 A1 | 12/2002 | Meisenburg et al. ........ 524/589 |
| 2003/0026999 A1 * | 2/2003 | Schelhaas et al. ......... 428/425.8 |
| 2003/0232199 A1 | 12/2003 | Rische et al. ............. 428/423.1 |
| 2003/0232907 A1 | 12/2003 | Rische et al. ............... 524/195 |
| 2003/0232953 A1 | 12/2003 | Rische et al. .................. 528/45 |
| 2004/0030086 A1 | 2/2004 | Schelhaas et al. ............. 528/45 |
| 2006/0069225 A1 * | 3/2006 | Wintermantel et al. ........ 528/44 |
| 2007/0083028 A1 * | 4/2007 | Gurtler et al. ................. 528/44 |

FOREIGN PATENT DOCUMENTS

| | | |
|---|---|---|
| CA | 2 356 685 | 7/2000 |
| DE | 33 16 592 | 11/1984 |
| DE | 40 40 290 | 7/1992 |
| EP | 928 800 | 7/1999 |
| WO | WO 03/004545 | * 1/2003 |

OTHER PUBLICATIONS

Ullmanns Encyclopädie der technischen Chemie, $4^{th}$ edition, vol. 19, (date unavailable) pp. 31-38, Dieter Maassen et al, "Polyalkylenglykole".
Houben-Weyl, Methoden der Organischen Chemie, $4^{th}$ edition, vol. XIV/1, (month unavailable) 1961, pp. 433-441, H. Logemann, "Abstoppmittel".
Chemistry & Technology of UV & EB Formulation for Coatings, Inks & Paints, vol. 2. (month unavailable) 1991, P.K.T. Olding ed. p. 37-56 & 123-135, N.S. Allen, M.A. Johnson, P.K.T. Oldring, M.S. Salim, "Prepolymers and Reactive Diluents for UV and EB Curable Formulations".

* cited by examiner

*Primary Examiner*—Rabon Sergent
(74) *Attorney, Agent, or Firm*—Robert S. Klemz; Noland J. Cheung

(57) ABSTRACT

An organic polyisocyanate with at least one unsaturated functional group is capable of copolymerizing when exposed to actinic radiation. The polyisocyanate comprises structural units with the formula (1):

(1)

wherein: X is an electron-attracting group; $R^1$, and $R^2$ are hydrogen atoms, a saturated or unsaturated aliphatic or cycloaliphatic radical, or an aromatic or araliphatic radical; and n is an integer from 0 to 5. A process for producing this polyisocyanate is also disclosed.

14 Claims, No Drawings

DUAL CURE SYSTEMS

CROSS REFERENCE TO RELATED PATENT APPLICATION

The present patent application claims the right of priority under 35 U.S.C. §119 (a)-(d) of German Patent Application No. 102 602 69.7, filed Dec. 20, 2002.

FIELD OF THE INVENTION

The present invention concerns new dual cure systems and polyisocyanate crosslinking agents, a process for their production and their use.

BACKGROUND OF THE INVENTION

Coating compounds that cure by means of two independent processes are generally known as dual cure systems. The binder components that they contain conventionally have different functional groups, which generally crosslink with one another independently under suitable conditions. Conventional dual cure systems of the prior art have radiation-curing and heat-curing groups, with particularly advantageous properties being obtained with the use of isocyanate and hydroxyl groups as thermally crosslinking functions.

EP-A 0 928 800 describes a dual cure system containing a crosslinking agent that contains both radiation-curing acrylate groups and isocyanate groups that can be heat-cured with suitable binders containing e.g. OH groups. Since NCO and OH groups react with one another even at room temperature, the above coating system can only be handled as a two-component system in which the NCO-containing and NCO-reactive components are mixed together shortly before or during the coating process. The disadvantage of only a very short pot life for these systems can be eliminated by blocking the free NCO groups. The combination of such radiation-curing and heat-curing systems that contain blocked isocyanate groups is described for example in EP-A-126 359, WO-A 01/42329 or U.S. Pat. No. 4,961,960.

With most blocked polyisocyanates of the prior art, the blocking agents they contain are released during the crosslinking reaction and then liberated. This not only has a negative effect on the VOC content of the coating systems, but released blocking agent also remains in the paint film, exerting a negative influence on the coating properties. The scratch resistance and acid resistance of one-component (1C) paint films are thus generally significantly poorer than in two-component (2C) polyurethane paint finishes (e.g. T. Engbert, E. König, E. Jürgens, Farbe & Lack, Curt R. Vincentz Verlag, Hanover October 1995). The release of the blocking agent and its escape from the paint film in gaseous form can also lead to blistering in the paint. Afterburning of the emitted blocking agent may be necessary in some cases.

For particularly low crosslinking temperatures in the range from 90 to 120° C., isocyanates blocked with diethyl malonate have recently been used (e.g. EP-A 0 947 531). In contrast to blocking reactions with e.g. N-heterocyclic compounds such as caprolactam or butanone oxime, in this case not all of the blocking agent is released, leading to an inter-esterification at the diethyl malonate during curing, with release of ethanol. The disadvantage here, however, is that because of the unstable ester bond such systems are extremely susceptible to the action of acid, such that the possible applications of these products are restricted.

SUMMARY OF THE INVENTION

The present invention provides organic polyisocyanates that include at least one unsaturated functional group that is capable of copolymerizing with ethylene-unsaturated compounds when exposed to actinic radiation. The polyisocyanates further includes structural units having the formula (1)

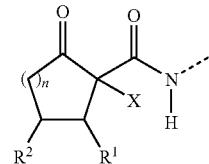

(1)

in which
X is an electron-attracting group,
$R^1$, and $R^2$ are independently selected from the group consisting of a hydrogen atom, a saturated or unsaturated aliphatic or cycloaliphatic radical, an optionally substituted aromatic or araliphatic radical and each contain up to 12 carbon atoms and optionally up to 3 heteroatoms of the elements oxygen, sulfur, or nitrogen and are optionally substituted by halogen atoms; and
n is an integer of from 0 to 5.

The present invention is also directed to a process for producing the polyisocyanates described above including reacting A1) one or more organic polyisocyanates together with
A2) one or more compounds comprising at least one isocyanate-reactive group and at least one group that is capable of copolymerizing with ethylene-unsaturated compounds when exposed to actinic radiation,
A3) optionally other isocyanate-reactive compounds and
A4) blocking agents containing at least one CH-acid cyclic ketone having the general formula (2),

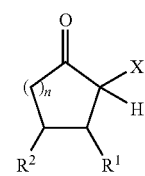

(2)

where X, $R^1$, $R^2$ and n are as described above,
A5) in the presence of one or more catalysts and
A6) optionally auxiliary substances and additives and
A7) optionally solvents.

The present invention is further directed to a method of making paints, coatings, sizes, adhesives and moulded articles that includes combining the polyisocyanates described above with one or more compounds containing isocyanate-reactive groups.

The present invention is additionally directed to coating compositions that include B1) one or more polyisocyanates according to claim 1 and/or
B2) one or more organic polyisocyanates displaying structural units having formula (1)

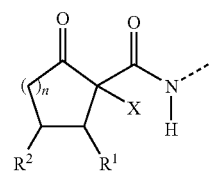

(1)

where X, $R^1$, $R^2$ and n are as described above,
B3) one or more compounds comprising at least one isocyanate-reactive group and optionally containing one or more functional groups that are capable of copolymerizing with ethylene-unsaturated compounds when exposed to actinic radiation, B4) optionally compounds comprising functional groups that are capable of copolymerizing with ethylene-unsaturated compounds when exposed to actinic radiation and that co not contain NCO groups or NCO-reactive groups, B5) optionally catalysts and B6) optionally auxiliary substances and additives B7) optionally products from reactions of components B1) to B6) with one another.

The present invention extends to a process for producing the coating compositions described above by mixing components B1) to B6), coatings obtained from coating compositions described above and substrates coated with those coatings.

Embodiments of the present invention are also directed to a method of thermoforming that includes forming a film comprising the coating compositions of claim 5;

curing the film by exposure to actinic radiation to form a non-blocking elastic layer; and drawing the non-blocking elastic layer over a moulded part at a temperature at which crosslinking occurs in the non-blocking elastic layer.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that CH-acid compounds with the basic structure of an activated cyclic ketone are particularly suitable for the blocking of isocyanate groups in order to obtain stable dual cure systems that react without releasing substances.

The invention provides organic polyisocyanates displaying at least one unsaturated functional group that reacts with ethylene-unsaturated compounds under the action of actinic radiation with polymerisation and displaying structural units having formula (1)

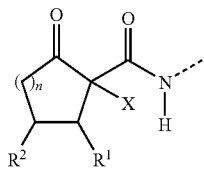

(1)

in which

X is an electron-attracting group, $R^1$, $R^2$ are mutually independently a hydrogen atom, a saturated or unsaturated aliphatic or cycloaliphatic radical, an optionally substituted aromatic or araliphatic radical and each contain up to 12 carbon atoms and optionally up to 3 heteroatoms of the elements oxygen, sulfur, nitrogen and are optionally substituted by halogen atoms and n is a whole number from 0 to 5.

The invention also provides a process for producing the polyisocyanates according to the invention wherein A1) one or more organic polyisocyanates are reacted together with A2) one or more compounds displaying at least one isocyanate-reactive group and at least one group that reacts with ethylene-unsaturated compounds under the action of actinic radiation with polymerisation, A3) optionally other isocyanate-reactive compounds and A4) blocking agents containing at least one CH-acid cyclic ketone having the general formula (2),

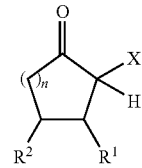

(2)

in which

X is an electron-attracting group, $R^1$, $R^2$ are mutually independently a hydrogen atom, a saturated or unsaturated aliphatic or cycloaliphatic radical, an optionally substituted aromatic or araliphatic radical and each contain up to 12 carbon atoms and optionally up to 3 heteroatoms of the elements oxygen, sulfur, nitrogen and are optionally substituted by halogen atoms and n is a whole number from 0 to 5, A5) in the presence of one or more catalysts and A6) optionally auxiliary substances and additives and A7) optionally solvents.

Isocyanate-reactive groups within the meaning of the invention are understood to be all functionalities that react with NCO functions spontaneously or under exposure to temperatures from 0 to 200° C., optionally with acceleration by catalysts known to the person skilled in the art from polyurethane chemistry. Examples of these include: hydroxyl, amino, aspartato, thiol groups and also such systems containing β-amino alcohols, such as e.g. tetrakis hydroxyethylene ethylene diamine or dialkyl aminoethanol or aminoethanol. Hydroxyl groups are preferred.

Actinic radiation is understood to be electromagnetic, ionising radiation, in particular electron beams, UV rays and visible light (Roche Lexikon Medizin, 4$^{th}$ edition; Urban & Fischer Verlag, Munich 1999).

For the preparation of the polyisocyanates according to the invention, all compounds displaying organic isocyanate groups, preferably aliphatic, cycloaliphatic, aromatic or heterocyclic polyisocyanates having an NCO functionality ≧2, can be used alone or in any combination as component A1), whereby it is unimportant whether these were produced by phosgenation or by phosgene-free methods.

Also very suitable are polyisocyanates with a uret dione, carbodiimide, isocyanurate, iminooxadiazine dione, biuret, urethane, allophanate, oxadiazine trione or acyl urea structure and polyisocyanate prepolymers having an average NCO functionality >1, such as are obtained by pre-reacting a molar excess of one of the above polyisocyanates with an organic-material containing at least two isocyanate-reactive hydrogen atoms per molecule, e.g. in the form of OH groups.

Within the meaning of the invention compounds of the aforementioned type having a molecular weight of 140 to 400 g/mol with aliphatically, cycloaliphatically, araliphatically and/or aromatically bonded isocyanate groups are preferably used in A1).

Examples of aliphatic and cycloaliphatic isocyanates for component A1) are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethyl pentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl) cyclohexane, 1-isocyanato-3,3,5-trimethyl-5-isocyanatomethyl cyclohexane (isophorone diiso-cyanate, IPDI), 4,4'-diisocyanatodicyclohexyl methane (Desmoduro® W, Bayer AG, Leverkusen), 4-isocyanatomethyl-1,8-octane diisocyanate (triisocyanatononane, TIN), ω,ω'-diisocyanato-1,3-dimethyl cyclohexane ($H_6XDI$), 1-isocyanato-1-methyl-3-isocyanatomethyl cyclohexane, 1-isocyanato-1-methyl-4-isocyanato-methyl cyclohexane, bis-(isocyanatomethyl) norbornane.

Examples of aromatic isocyanates for component A1) are 1,5-naphthalene diisocyanate, 1,3- and 1,4-bis-(2-isocyanatoprop-2-yl) benzene (TMXDI), 2,4- and 2,6-diisocyanatotoluene (TDI), in particular the 2,4- and the 2,6-isomer and technical mixtures of the two isomers, 2,4'- and 4,4'-diisocyanatodiphenyl methane (MDI), 1,5-diisocyanatonaphthaline, 1,3-bis(isocyanatomethyl) benzene (XDI).

Polyisocyanates or polyisocyanate mixtures of the cited type with exclusively aliphatically and/or cycloaliphatically bonded isocyanate groups, particularly based on hexamethylene diisocyanate (HDI), isophorone diisocyanate (IPDI) and/or 4,4'-diisocyanatodicyclohexyl methane, are particularly preferably used in component A1).

All compounds displaying at least one isocyanate-reactive group and at least one unsaturated function that reacts with ethylene-unsaturated compounds under the action of actinic radiation with polymerisation can be used alone or in any combination as component A2).

α,β-unsaturated carboxylic acid derivatives such as acrylates, methacrylates, maleinates, fumarates, maleimides, acrylamides, and compounds containing vinyl ether, propenyl ether, allyl ether and dicyclopentadienyl units, which display at least one isocyanate-reactive group, are preferably used as compounds for component A2, these are particularly preferably acrylates and methacrylates with at least one isocyanate-reactive group.

Examples of compounds for component A2) are 3-isocyanatopropyl methacrylate, partial reaction products of polyisocyanates with hydroxy-functional acrylates or methacrylates to compounds with urethane and/or allophanate structural units such as are described for example in DE-OS 29 09 715 (in particular example adducts P, Q, R and S), EP-A 126 359 (in particular examples 1 to 3), U.S. Pat. No. 6,465, 539 (page 2, line 20 to page 4, line 55, and in particular the example compounds F and G) and DE-A-198 60 041 (in particular examples 1 to 10, 12 and V1 to V4).

Compounds that are suitable as hydroxy-functional acrylates or methacrylates include for example 2-hydroxyethyl (meth)acrylate, polyethylene oxide mono(meth)acrylates, polypropylene oxide mono(meth)acrylates, polyalkylene oxide mono(meth)acrylates, poly(ε-caprolactone) mono (meth)acrylates, such as e.g. Tone® M100 (Union Carbide, USA), 2-hydroxypropyl(meth)acrylate, 4-hydroxybutyl (meth)acrylate, 3-hydroxy-2,2-dimethyl propyl(meth)acrylate, the hydroxy-functional mono-, di- or tetraacrylates of polyhydric alcohols such as trimethylol propane, glycerol, pentaerythritol, dipentaerythritol, ethoxylated, propoxylated or alkoxylated trimethylol propane, glycerol, pentaerythritol, dipentaerythritol or technical mixtures thereof. Also suitable are alcohols that can be obtained by reacting double bond-containing acids with monomeric epoxy compounds optionally containing double bonds, such as e.g. the reaction products of (meth)acrylic acid with glycidyl (meth)acrylate or the glycidyl ester of versatic acid (Cardura® E10, Resolution Nederland BV, Shell BV, NL).

Compounds having a hydrophilising action and with at least one isocyanate-reactive group, for example, can be used alone or in combination as component A3). Compounds having a hydrophilising action are used in particular if the polyisocyanate according to the invention is to be dissolved or dispersed in water or hydrous mixtures.

Compounds having a hydrophilising action are understood to be all ionically, potentially ionically and non-ionically hydrophilising compounds with at least one isocyanate-reactive group. These compounds preferably display hydroxy and/or amino functions as isocyanate-reactive groups.

Compounds displaying at least one isocyanate-reactive group and at least one functionality, such as e.g. —COOY, —$SO_3Y$, —$PO(OY)_2$ (Y=H, $NH_4^+$, metal cation), —$NR_2$, —$NR_3^+$, —$PR_3^+$ (R=H, alkyl, aryl), are preferably used as ionically or potentially ionically hydrophilising compounds for component A3). Potentially ionically hydrophilising is understood to refer to such compounds that enter into an optionally pH-dependent dissociation equilibrium on interaction with aqueous media and in this way are negatively, positively or neutrally charged.

Suitable ionically or potentially ionically hydrophilising compounds are for example mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and their salts such as dimethylol propionic acid, dimethylol butyric acid, hydroxypivalic acid, N-(2-aminoethyl)-β-alanine, 2-(2-aminoethylamino)ethane sulfonic acid, ethylene diamine propyl or butyl sulfonic acid, 1,2- or 1,3-propylene diamine-β-ethyl sulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, example 1) and alkali and/or ammonium salts thereof, the adduct of sodium bisulfate to butene-2-diol-1,4, polyether sulfonate, the propoxylated adduct of 2-butenediol and $NaHSO_3$, described for example in DE-A 2 446 440 (page 5-9, formula I-III), and structural elements that can be converted into cationic groups such as N-methyl diethanol amine as hydrophilic structural components. Preferred ionically or potential ionically hydrophilising compounds are those with carboxy or carboxylate and/or sulfonate groups and/or ammonium groups. Particularly preferred ionic compounds are those containing carboxyl and/or sulfonate groups as ionic or potentially ionic groups, such as the salts of N-(2-aminoethyl)-β-alanine, of 2-(2-aminoethyl-amino)ethane sulfonic acid or of the addition product of IPDI and acrylic acid (EP-A 0 916 647, example 1) and of dimethylol propionic acid.

Compounds having a polyether structure, preferably alkylene oxide-based polyethers, containing at least one hydroxy or amino group as isocyanate-reactive group, can be used as hydrophilic non-ionic compounds.

These compounds having a polyether structure can for example be monohydric polyalkylene oxide polyether alcohols displaying a statistical mean of 5 to 70, preferably 7 to 55 ethylene oxide units per molecule and with at least 30 mol % ethylene oxide, such as can be obtained by known means by alkoxylation of suitable starter molecules (e.g. in Ullmanns Encyclopädie der technischen Chemie, $4^{th}$ edition, volume 19, Verlag Chemie, Weinheim, p. 31-38).

Suitable starter molecules are for example saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methyl cyclohexanols or hydroxymethyl cyclohexane, 3-ethyl-3-hydroxymethyl oxetane or tetrahydrofurfuryl alcohol, diethylene glycol monoalkyl ethers such as e.g. diethylene glycol monobutyl ether, unsaturated alcohols such as allyl alcohol, 1,1-dimethyl allyl alcohol or oleic alcohol, aromatic alcohols such. as phenol, the isomeric cresols or methoxy phenols, araliphatic alcohols such as benzyl alcohol, anisyl alcohol or cinnamyl alcohol, secondary monoamines such as dimethylamine, diethylamine, dipropylamine, diisopropylamine, dibutylamine, bis-(2-ethylhexyl)amine, N-methyl and N-ethyl cyclohexylamine or dicyclohexylamine and heterocyclic secondary amines such as morpholine, pyrrolidine, piperidine or 1H-pyrazole. Preferred starter molecules are saturated monoalcohols. Diethylene glycol monobutyl ether is particularly preferably used as starter molecule.

Suitable alkylene oxides for the alkoxylation reaction are in particular ethylene oxide and propylene oxide, which can be used in the alkoxylation reaction in any order, separately or in combination, such that block or mixed polyethers are obtained.

The compounds having a polyether structure are preferably pure polyethylene oxide polyethers or mixed polyalkylene oxide polyethers, whose alkylene oxide units consist of at least 30 mol %, preferably at least 40 mol % ethylene oxide units.

Most particularly preferred are monofunctional mixed polyalkylene oxide polyethers displaying at least 40 mol % ethylene oxide and a maximum of 60 mol % propylene oxide units.

Furthermore, low-molecular monoalcohols, diols or polyols such as short-chain aliphatic, araliphatic or cycloaliphatic monoalcohols, diols or triols, i.e. containing 2 to 20 carbon atoms, can be used as compounds for component A3). Examples of monoalcohols are methanol, ethanol, the isomeric propanols, butanols, pentanols, also diacetone alcohol, fatty alcohols or fluorinated alcohols such as are available e.g. under the name Zonyl® from DuPont. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butyl propanediol, trimethyl pentanediol, position-isomeric diethyl octanediols, 1,3-butylene glycol, cyclohexanediol, 1,4-cyclohexanedi-methanol, 1,6-hexanediol, 1,2- and 1,4-cyclohexanediol, hydrogenated bisphenol A (2,2-bis(4-hydroxycyclohexyl) propane), 2,2-dimethyl-3-hydroxypropionic acid-(2,2-dimethyl-3-hydroxypropyl ester). Examples of suitable triols are trimethylol ethane, trimethylol propane or glycerol. The alcohols 1,4-butanediol, 1,4-cyclohexane dimethanol, 1,6-hexanediol and trimethylol propane are preferred.

If used at all, cited monoalcohols, diols or triols are preferably used in quantities of only <0.3, in particular <0.1 equivalents per equivalent of isocyanate. The use of these monoalcohols, diols or triols is particularly preferably avoided.

CH-acid cyclic ketones having the general formula (2) are used as blocking agents in component A4)

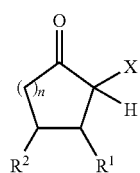

(2)

in which
X is an electron-attracting group,
R$^1$, R$^2$ are mutually independently a hydrogen atom, a saturated or unsaturated aliphatic or cycloaliphatic radical, an optionally substituted aromatic or araliphatic radical and each contain up to 12 carbon atoms and optionally up to 3 heteroatoms of the elements oxygen, sulfur, nitrogen and are optionally substituted by halogen atoms and
n is a whole number from 0 to 5.

The electron-attracting group X can be all substituents that through e.g. mesomeric and/or inductive effects lead to a CH acidity in the alpha hydrogen. These can for example be ester groups, sulfoxide groups, sulfo groups, nitro groups, phosphonate groups, nitrile groups, isonitrile groups or carbonyl groups. Nitrile and ester groups are preferred, particularly preferably the methyl carboxylate and ethyl carboxylate groups.

Also suitable are compounds having the general formula (2), whose ring optionally contains heteroatoms such as oxygen, sulfur or nitrogen atoms. The structural motif of a lactone is preferred here. The basic structure of a lactone or a thiolactone is preferred here.

The activated cyclic system having formula (2) preferably displays a ring size of 5 (n=1) and 6 (n=2).

Preferred compounds having the general formula (2) are cyclopentanone-2-carboxymethyl ester and carboxyethyl ester, cyclopentanone-2-carboxylic acid nitrile, cyclohexanone-2-carboxylmethyl ester and carboxyethyl ester or cyclopentanone-2-carbonyl methane. Particularly preferred are cyclopentanone-2-carboxymethyl ester and carboxyethyl ester and cyclohexanone-2-carboxymethyl ester and carboxyethyl ester.

The cited CH-acid cyclic ketones can naturally be used in component A4) both in mixtures with one another and in any mixtures with other blocking agents. Suitable other blocking agents are for example alcohols, lactams, oximes, malonic esters, alkyl acetoacetates, triazoles, phenols, imidazoles, pyrazoles and amines, such as e.g. butanone oxime, diisopropylamine, 1,2,4-triazole, dimethyl-1,2,4-triazole, imidazole, diethyl malonate, acetoacetic ester, acetone oxime, 3,5-dimethyl pyrazole, ε-caprolactam, N-methyl, N-ethyl, N-(iso) propyl, N-n-butyl, N-iso-butyl, N-tert.-butyl benzylamine or 1,1-dimethyl benzylamine, N-alkyl-N-1,1,-dimethyl methyl phenylamine, adducts of benzylamine to compounds with activated double bonds such as malonic esters, N,N-dimethyl aminopropyl benzylamine and other optionally substituted benzyl amines and/or dibenzyl amine containing tertiary amino groups or any mixtures of these blocking agents. If used at all, the proportion of these other blocking agents that differ from CH-acid cyclic ketones in component A4) is up to 80 wt. %, preferably up to 60 wt. %, most particularly preferably up to 20 wt. % of the entire component A4).

Cyclopentanone-2-carboxyethyl ester is most particularly preferably used exclusively as component A4).

The ratio of isocyanate groups to be blocked to blocking agent A4) is 0.8 to 1.2 mol, preferably 1:1.

The content of free NCO groups in the polyisocyanates according to the invention is <5 wt. %, preferably <0.5 wt. %, in particular <0.1 wt. %.

All compounds known to the person skilled in the art for the catalysis of NCO blocking can be used alone or in any combination as compounds for component A5). Alkali and alkaline-earth metal bases are preferred, such as e.g. pulverised sodium carbonate (soda) or trisodium phosphate, the metal salts of the second subgroup, in particular zinc, and tertiary amines such as DABCO (1,4-diazabicyclo[2.2.2]octane).

Sodium carbonate, potassium carbonate or zinc salts, in particular zinc-2-ethyl hexanoate, are preferably used in component A5).

The component A5) is used in the process according to the invention in a quantity of 0.05 to 10 wt. %, preferably 0.1 to 3 wt. %, in particular 0.2 to 1 wt. %, relative to the non-volatile content of the polyisocyanate according to the invention.

All auxiliary substances and additives or mixtures thereof known to the person skilled in the art from polyurethane chemistry and from the chemistry of ethylene-unsaturated coating compounds can be included as the optionally used component A6). The use of stabilisers to prevent premature polymerisation in a quantity of 0.01 to 1 wt. %, preferably 0.1 to 0.5 wt. %, relative to the quantity of unsaturated groups, is preferred. Such inhibitors are described for example in Houben-Weyl, Methoden der organischen Chemie, 4$^{th}$ edition, volume XIV/1, Georg Thieme Verlag, Stuttgart 1961, page 433 ff. Examples that can be cited are: sodium dithionite, sodium hydrogen sulfide, sulfur, hydrazine, phenyl hydrazine, hydra-zobenzene, N-phenyl-β-naphthylamine, N-phenyl ethanol diamine, dinitro-benzene, picric acid, p-nitrosodimethyl aniline, diphenyl nitrosamine, phenols, such as para-methoxy phenol, 2,5-di-tert.-butyl hydroquinone, 2,6-di-tert.-butyl-4-methyl-phenol, p-tert.-butyl catechol or 2,5-di-tert.-amyl hydroquinone, tetramethyl thiuram disulfide, 2-mercaptobenzothiazole, dimethyl dithiocarbamic acid sodium salt, phenothiazine, N-oxyl compounds such as e.g. 2,2,6,6-tetramethyl piperidine-N-oxide (TEMPO) or one of its derivatives. The stabilisers can equally be incorporated chemically, whereby compounds of the aforementioned classes are particularly suitable if they also carry other free aliphatic alcohol groups or primary or secondary amine groups and are thus then stabilisers that are chemically bonded via urethane or urea groups. Particularly suitable for this purpose is 2,2,6,6-tetramethyl-4-hydroxy piperidine-N-oxide. In a preferred variant an oxygen-containing gas, preferably air, is also introduced during production of the polyisocyanates according to the invention.

Production of the polyisocyanates according to the invention can be performed without solvent or in the presence of suitable solvents, or reactive thinners. Suitable solvents are the conventional paint solvents, such as e.g. butyl acetate, methoxypropyl acetate or solvent naphtha from Exxon Chemie as an aromatics-containing solvent and mixtures of the cited solvents. Blocking is preferably performed in the cited solvents, the solids content to be established being between 10 and 90%.

Suitable reactive thinners are for example the compounds known in radiation curing technology (cf. Römpp Lexikon Chemie, p. 491, 10$^{th}$ edition, Georg-Thieme-Verlag, Stuttgart), in particular those having low hydroxyl contents of below 30, preferably below 10 mg KOH/g. The esters of acrylic acid or methacrylic acid, preferably acrylic acid, of the following alcohols can be mentioned by way of example: isomeric butanols, pentanols, hexanols, heptanols, octanols, nonanols and decanols, also cycloaliphatic alcohols such as isobornol, cyclohexanol and alkylated cyclohexanols, dicyclopentanol, arylaliphatic alcohols such as phenoxyethanol and nonyl phenyl ethanol, and tetrahydrofurfuryl alcohols. Alkoxylated derivatives of these alcohols can also be used. Dihydric alcohols are for example alcohols such as ethylene glycol, propanediol-1,2, propanediol-1,3, diethylene glycol, dipropylene glycol, the isomeric butanediols, neopentyl glycol, hexanediol-1,6,2-ethyl hexanediol and tripropylene glycol or alkoxylated derivatives of these alcohols. Preferred dihydric alcohols are hexanediol-1,6, dipropylene glycol and tripropylene glycol. Polyhydric alcohols are glycerol, trimethylol propane, ditrimethylol propane, pentaerythritol or dipentaerythritol or alkoxylated derivatives thereof.

The polyisocyanates according to the invention are preferably produced in a temperature range from 25 to 180° C., preferably from 30 to 90° C.

In a preferred embodiment of the invention, component A1) is set out first and reacted at temperatures of 30 to 150° C. with A2), optionally A3) and optionally A4) until the NCO content has fallen to the desired value. Components A2) to A4) can be added individually in any order or as a mixture. Addition as a mixture is preferred. During the reaction of the cited components an oxygen-containing gas, preferably air, is preferably passed through the reaction medium.

It is also possible to set out A2), A3) and A4) first and add A1). Alternatively, only A2), A3), A4) or a mixture of two of these components can be set out first, then A1) added and finally the missing components A2), A3) and/or A4).

The component A5) can be added at the start, during or after the addition of A2), A3) or A4). A5) is preferably added immediately after A4). If present, at least part of A6), especially if it includes stabilisers, is added before addition of A2). Solvent A7) is preferably added before or after the end of the reaction. Particularly if the solvent reacts with isocyanates it is convenient not to add the solvent until the reaction is ended or the NCO content has fallen below 1 wt. %.

Per equivalent of NCO in A1), 0.2 to 0.8 equivalents of A4) are preferably used, in particular 0.3 to 0.7 equivalents of A4). Per equivalent of NCO in A1), 0.2 to 0.8 equivalents of A2) are preferably used, in particular 0.3 to 0.7 equivalents of A4).

If the polyisocyanates according to the invention are intended to be a component of a coating compound that is solid on application, e.g. a powder coating, the polyisocyanates according to the invention should either be amorphous with a glass transition temperature of 20 to 90° C., in particular 30 to 65° C., or crystalline, with a melting point of 30 to 130° C., in particular 60 to 120° C. Such polyisocyanates are obtained for example by using compounds having cycloaliphatic structural units in the production of the polyisocyanates according to the invention. Cycloaliphatic diisocyanates are preferably used to this end in component A1).

The invention also provides coating compounds containing

B1) one or more polyisocyanates according to the invention and/or

B2) one or more organic polyisocyanates displaying structural units having formula (1)

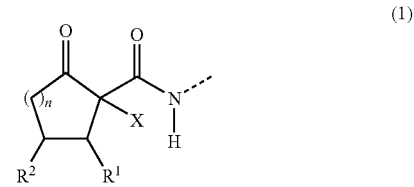

in which

X is an electron-attracting group,

R$^1$, R$^2$ are mutually independently a hydrogen atom, a saturated or unsaturated aliphatic or cycloaliphatic radical, an optionally substituted aromatic or araliphatic radical and each contain up to 12 carbon atoms and optionally up to 3 heteroatoms of the elements oxygen, sulfur, nitrogen and are optionally substituted by halogen atoms and n is a whole number from 0 to 5.

B3) one or more compounds displaying at least one isocyanate-reactive group and optionally containing one or more functional groups that react with ethylene-unsaturated compounds under the action of actinic radiation with polymerisation, B4) optionally compounds carrying functional groups that react with ethylene-unsaturated compounds under the action of actinic radiation with polymerisation and that display neither NCO groups nor NCO-reactive groups, B5) optionally catalysts and B6) optionally auxiliary substances and additives B7) optionally products from reactions of components B1) to B6) with one another.

Polyisocyanates within the meaning of B2) are based on the isocyanates already cited above for component A1), in particular those cited there as being preferred.

In addition to the structures having the general formula (1), the polyisocyanates for component B2) can also display blocked NCO groups that are blocked with other blocking agents cited under A4) that differ from cyclic ketones. The production of the blocked polyisocyanates used under B2) is known to the person skilled in the art and proceeds in the same way as blocking of the polyisocyanates according to the invention, optionally using cited catalysts.

The compounds for component B3) can be monomeric, oligomeric or polymeric and contain at least one, preferably two or more isocyanate-reactive groups.

Suitable compounds for component B3) are low-molecular short-chain aliphatic, araliphatic or cycloaliphatic diols or triols, i.e. containing 2 to 20 carbon atoms. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butyl propanediol, trimethyl pentanediol, position-isomeric diethyl octanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl) propane), 2,2-dimethyl-3-hydroxypropionic acid-(2,2-dimethyl-3-hydroxypropyl ester). Examples of suitable triols are trimethylol ethane, trimethylol propane or glycerol. Suitable higher-functional alcohols are ditrimethylol propane, pentaerythritol, dipentaerythritol or sorbitol.

High-molecular weight polyols such as polyester polyols, polyether polyols, hydroxy-functional acrylic resins, hydroxy-functional polyurethanes or corresponding hybrids (cf. Römpp Lexikon Chemie, p. 465-466, $10^{th}$ edition 1998, Georg-Thieme-Verlag, Stuttgart) are also suitable.

The compounds for component B3) also include all compounds already listed under A2) and also isocyanate-reactive oligomeric or polymeric unsaturated compounds containing acrylate and/or methacrylate groups alone or in combination with the aforementioned monomeric compounds. Hydroxyl group-containing polyester acrylates with an OH content of 30 to 300 mg KOH/g, preferably 60 to 200, particularly preferably 70 to 120, are preferably used here.

The production of polyester acrylates is described in DE-A 4 040 290 (p. 3, line 25 to p. 6, line 24), DE-A-3 316 592 (p. 5, line 14 to p. 11, line 30) and P. K. T. Oldring (Ed.), Chemistry & Technology of UV & EB Formulations for Coatings, Inks & Paints, vol. 2, 1991, SITA Technology, London, p. 123 to 135.

Likewise able to be used in B3) are the known hydroxyl group-containing epoxy (meth)acrylates having OH contents of 20 to 300 mg KOH/g, preferably 100 to 280 mg KOH/g, particularly preferably 150 to 250 mg KOH/g or hydroxyl group-containing polyurethane (meth)acrylates having OH contents of 20 to 300 mg KOH/g, preferably 40 to 150 mg KOH/g, particularly preferably 50 to 100 mg KOH/g and mixtures thereof with one another and mixtures with hydroxyl group-containing unsaturated polyesters and mixtures with polyester (meth)acrylates or mixtures of hydroxyl group-containing unsaturated polyesters with polyester (meth)acrylates. Such compounds are likewise described in P. K. T. Oldring (Ed.), Chemistry & Technology of UV & EB Formulations for Coatings, Inks & Paints, vol. 2, 1991, SITA Technology, London, p. 37 to 56. Hydroxyl group-containing epoxy (meth)acrylates are based in particular on reaction products of acrylic acid and/or methacrylic acid with epoxides (glycidyl compounds) of monomeric, oligomeric or polymeric bisphenol A, bisphenol F, hexanediol and/or butanediol or ethoxylated and/or propoxylated derivatives thereof.

Polymers such as polyacrylates, polyurethanes, polysiloxanes, as well as compounds that react with ethylene-unsaturated compounds under the action of actinic radiation with polymerisation, can be used as compounds for component B4). Such groups are α,β-unsaturated carboxylic acid derivatives such as acrylates, methacrylates, maleinates, fumarates, maleimides, acrylamides, and also compounds containing vinyl ether, propenyl ether, allyl ether and dicyclopent-adienyl units. Acrylates and methacrylates are preferred. Examples contain the reactive thinners known in radiation curing technology (cf. Römpp Lexikon Chemie, p. 491, $10^{th}$ edition 1998, Georg-Thieme-Verlag, Stuttgart) or the binders known in radiation curing technology such as polyether acrylates, polyester acrylates, urethane acrylates, epoxy acrylates, provided that they display a content of hydroxyl groups of below 30, preferably below 20, particularly preferably below 10 mg KOH/g.

The esters of acrylic acid or methacrylic acid, preferably acrylic acid, of the following alcohols can be cited by way of example as a component of B4). Monohydric alcohols are the isomeric butanols, pentanols, hexanols, heptanols, octanols, nonanols and decanols, also cycloaliphatic alcohols such as isobornol, cyclohexanol and alkylated cyclohexanols, dicyclopentanol, arylaliphatic alcohols such as phenoxyethanol and nonyl phenyl ethanol, and tetrahydrofurfuryl alcohols. Alkoxylated derivatives of these alcohols can also be used. Dihydric alcohols are for example alcohols such as ethylene glycol, propanediol-1,2, propanediol-1,3, diethylene glycol, dipropylene glycol, the isomeric butanediols, neopentyl glycol, hexanediol-1,6,2-ethyl hexanediol and tripropylene glycol or alkoxylated derivatives of these alcohols. Preferred dihydric alcohols are hexanediol-1,6, dipropylene glycol and tripropylene glycol. Polyhydric alcohols are glycerol, trimethylol propane, ditrimethylol propane, pentaerythritol or dipentaerythritol or alkoxylated derivatives thereof.

Lewis acids can in principle also be used as a component of B5) to accelerate curing of the blocked isocyanates with the hydrogen-containing reaction partners such as alcohols, amines and the mixed alcohol- and amine-containing reaction partners. At least divalent ions of Lewis acids are suitable here. Salts of zinc, titanium, zirconium and bismuth are suitable, for example. Compounds of zinc and zirconium are preferred, with zinc-2-ethyl hexanoate being particularly preferred.

The quantity of catalyst B5) can be adjusted to the curing requirements by the person skilled in the art, taking the curing temperature into account. Suitable quantities are for example 0.01 to 2 wt. %, with the use of 0.05 to 1 wt. % being preferred and 0.07 to 0.6 wt. % of catalyst to total solids content being particularly preferred. If the procedure is to be performed at elevated stoving temperatures, i.e. above around 160° C., the use of catalyst can optionally also be omitted.

Additives or auxiliary substances that are conventionally used in the technology of coatings, paints, printing inks, sealants and adhesives can be included as component B6). These also include initiators that can be activated by actinic radiation, triggering a radical polymerisation of the corresponding polymerisable groups. Photoinitiators, which are activated by UV or visible light, are preferred here. Photoinitiators are known compounds that are sold commercially, a distinction being made between unimolecular (type I) and bimolecular (type II) initiators. Suitable (type I) systems include aromatic ketone compounds, e.g. benzophenones in combination with tertiary amines, alkyl benzophenones, 4,4'-bis(dimethylamino)benzophenone (Michler's ketone), anthrone and halogenated benzophenones or mixtures of the cited types. Also suitable are (type II) initiators such as benzoin and its derivatives, benzil ketals, acyl phosphine oxides, e.g. 2,4,6-trimethyl benzoyl diphenyl phosphine oxide, bisacyl phosphine oxides, phenylglyoxylic acid esters, camphor quinone, α-aminoalkyl phenones, α,α-dialkoxyacetophenones and α-hydroxyalkyl phenones. If the coating compound according to the invention is to be processed aqueously, photoinitiators that are readily incorporated into aqueous coating compounds are preferably used. Examples of such products are Irgacure® 500, Irgacure® 819 DW (Ciba, Lampertheim, DE), Esacure® KIP (Lamberti, Aldizzate, Italy). Mixtures of these compounds can also be used.

If curing of the polymerisable components is also to be initiated by heat, suitable compounds for component B6) are peroxy compounds such as diacyl peroxides e.g. benzoyl peroxide, alkyl hydroperoxide such as diisopropyl benzene monohydroperoxide, alkyl peroxy esters such as tert.-butyl perbenzoate, dialkyl peroxides such as di-tert.-butyl peroxide, peroxide dicarbonates such as dicetyl peroxide dicarbonate, inorganic peroxides such as ammonium peroxodisulfate, potassium peroxodisulfate or azo compounds such as 2,2'-azobis[N-(2-propenyl)-2-methyl propionamides], 1-[(cyano-1-methyl ethyl) azo] formamides, 2,2'-azobis(N-butyl-2-methyl propionamides), 2,2'-azobis(N-cyclohexyl-2-methyl propionamides), 2,2'-azobis {2-methyl-N-[2-(1-hydroxybutyl)] propionamides}, 2,2'-azobis{2-methyl-N-[2-(1-hydroxybutyl)]propionamides}, 2,2'-azobis{2-methyl-N-[1,1-bis(hydroxymethyl)-2-hydroxyethyl]propionamides}, additionally also benzopinacol. Compounds that are water-soluble or take the form of aqueous emulsions are preferred for aqueous coating systems. These radical formers can be, combined with accelerators by known means.

Other additives that can be used are stabilisers already described under A6), light stabilisers such as UV absorbers and sterically hindered amines (HALS), also antioxidants, fillers and paint auxiliary substances, e.g. antisettling agents, antifoam and/or wetting agents, flow control agents, reactive thinners, plasticisers, catalysts, auxiliary solvents and/or thickeners as well as pigments, dyes and/or flatting agents. The use of light stabilisers and the various types are described for example in A. Valet, Lichtschutzmittel für Lacke, Vincentz Verlag, Hanover, 1996.

The polyisocyanates according to the invention can be used to produce paints, coatings, sizes, adhesives and moulded articles.

The invention also provides a process for producing the coating compounds according to the invention, wherein the components of the coating compound are mixed together in any sequence at temperatures from −20 to 120° C., preferably 10 to 90° C., in particular 20 to 60° C. The coating compound can be solid, liquid, dissolved or dispersed at room temperature. Solid coating compounds are produced with the devices conventionally used in powder coating technology, in particular with extruders, mills and air separators. For liquid, dissolved or dispersed coating compounds, the mixers and dispersing devices known to the person skilled in the art from liquid systems coating technology are suitable.

The ratio of blocked isocyanate groups in B1) and B2) to isocyanate-reactive groups in B3) is preferably 0.5 to 2, preferably 0.8 to 1.5, particularly preferably 1 to 1.

The compounds B4) are optionally used in quantities of up to 75 wt. %, preferably below 50 wt. % relative to the coating compound, and particularly preferably not used at all.

The coating compounds according to the invention can be applied to a wide range of substrates by the conventional methods, such as e.g. by spraying, rolling, knife application, pouring, atomisation, brushing, impregnating or dipping. Suitable substrates are for example wood, metal, particularly also metal used in wire, coil, can or container coating applications, also plastics, in particular ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations as defined in DIN 7728 Part 1), paper, leather, textiles, felt, glass, electronic modules or mineral substrates. Substrates consisting of a number of the above materials or pre-coated substrates can also be coated. It is also possible to apply the coating compounds to a substrate only temporarily, then to cure them partially or completely and detach them again, e.g. to produce films.

The applied film thicknesses (before curing) are typically between 0.5 and 5000 μm, preferably between 5 and 1500 μm, particularly preferably between 15 and 1000 μm.

Radiation curing is preferably performed under the action of high-energy radiation, in other words UV radiation or daylight, e.g. light of wavelength 200 to 750 nm, or by irradiation with high-energy electrons (electron beam radiation, 150 to 300 keV). High-pressure mercury vapour lamps, wherein the mercury vapour can be modified by doping with other elements such as gallium or iron, can be used for example as radiation sources for light or UV light. Lasers, pulsed lamps (known as UV flash radiators), halogen lamps or eximer radiators are also possible. The radiators can be installed in a fixed location, such that the item to be irradiated is moved past the radiation source with a mechanical device, or the radiators can be movable and the item to be irradiated does not change position during curing. The conventionally adequate radiation dose for crosslinking in UV curing is in the range from 80 to 5000 mJ/cm$^2$.

Irradiation can optionally also be performed with exclusion of oxygen, e.g. under an inert gas atmosphere or oxygen-reduced atmosphere. Nitrogen, carbon dioxide, noble gases or combustion gases are preferably suitable as inert gases. In addition, irradiation can be performed by covering the coating with media that are transparent for radiation. Examples of these are e.g. plastic films, glass or liquids such as water.

Depending on the radiation dose and curing conditions, the type and concentration of the initiator that is optionally used can be varied in the manner known to the person skilled in the art.

High-pressure mercury radiators in fixed installations are particularly preferably used for curing. Photoinitiators are then used in concentrations of 0.1 to 10 wt. %, particularly preferably 0.2 to 3.0 wt. %, relative to the solids in the coating. A dose of 200 to 3000 mJ/cm$^2$, measured in the wavelength range from 200 to 600 nm, is preferably used to cure these coatings.

The coating compound according to the invention also cures by the action of heat energy. The heat energy can be introduced into the coating by radiation, thermal conductivity and/or convection, whereby the infrared radiators, near infrared radiators and/or ovens customarily found in coating technology are conventionally used. The introduction of heat energy initiates the crosslinking reaction of the cyclic ketone groups with the isocyanate-reactive groups in the coating compound.

Since the action of actinic radiation and the generation of heat energy set in motion two independent chemical mechanisms, the sequence of actinic radiation/heat energy, and hence the sequence in which the mechanisms proceed, can be combined in any way. Any organic, solvent and/or water that may be present is preferably first removed by the methods conventionally used in coating technology. In a preferred variant complete or partial curing is then performed initially by the action of actinic radiation. Heat curing can take place immediately afterwards or later, in the same or in a separate location. For example, it is possible to produce initially flexible coatings, which withstand deformation of the substrate without being damaged, and then subsequently to cure them further by heat. For example, optionally pre-coated metal in the form of coils can be coated and the coatings first cured by the action of actinic radiation to form a flexible coating. The coated coils can then be used to produce specific parts by methods known to the person skilled in the art, e.g. punching, and reshaped mechanically without the coating being damaged and tearing for example. Heat energy is then used to initiate the crosslinking reaction of the cyclic ketone groups with the isocyanate-reactive groups in the coating compound, such that very resistant coatings are formed which are also suitable for example as clear coats for car bodies or for parts used in automotive construction.

In another variant a plastic film is first coated and the coating cured by actinic radiation to form a non-blocking but elastic layer. This film can later be drawn over a moulded part and bonded to it. This process, known as thermoforming, is preferably performed at elevated temperatures, whereby during the thermoforming process, at its end and/or after the thermoforming process the temperature reached is the temperature that is necessary for crosslinking of the cyclic ketone groups with the isocyanate-reactive groups in the coating compound, such that the coating crosslinks to form a highly resistant layer.

In another variant it is also possible to crosslink by heat energy initially and then to continue crosslinking of the surfaces of the coated substrate thus obtained or of the part consisting solely of the coating compound according to the invention under the action of actinic radiation at temperatures of 0 to 300° C., preferably 23 to 200° C., in particular 80 to 150° C. It can be particularly advantageous to combine the method of heat curing of coatings known to the person skilled in the art as in-mould coating with a subsequent crosslinking by actinic radiation outside the mould.

EXAMPLES

Unless otherwise specified, all percentages should be taken to be percentage by weight (wt. %).

Desmodur® N3300: HDI polyisocyanate with an isocyanurate structure, NCO content 21.8%, viscosity 3000 mPas/23° C., Bayer AG, Leverkusen, DE.

Desmodur® XP 2410: Polyisocyanate based on a hexamethylene diisocyanate trimer with isocyanurate and iminooxadiazine dione structural units, NCO content 23.0 wt. %, viscosity 700 mPas/23° C., Bayer AG, Leverkusen, DE.

Baymicron® OXA WM 06: Oligomeric polyisocyanate with predominantly oxadiazine trione structural units consisting of hexamethylene diisocyanate and carbon dioxide, NCO content: 20.2 to 20.7%, Bayer AG, Leverkusen, DE.

The content of free NCO groups was determined by titration in accordance with DIN EN ISO 11909 (titration with dibutylamine).

The viscosities were determined at 23° C. with a rotational viscometer (ViscoTester® 550 and Haake PK 100, Thermo Haake GmbH, D-76227 Karlsruhe).

A Paragon 1000 FT-IR measuring instrument from Perkin Elmer was used to record the IR spectra. The samples were measured between commercial NaCl plates without additional dilution.

Example 1

Blocked Polyisocyanate Containing Acrylate Groups 11.61 g (0.1 val) hydroxyethyl acrylate, 31.86 g (0.204 val) cyclopentanone-2-carboxyethyl ester and 59.1 g (0.3 val) Desmodur® N3300, 103 mg zinc-2-ethyl hexanoate and 103 mg 2,6-di-tert.-butyl-4-methylphenol in 25.6 g butyl acetate (solids content 80%) were mixed together in a 250 ml three-neck flask with mechanical stirring and internal thermometer and stirred at 35° C. until the NCO content had dropped to 0%, which could be detected by a reduction in the band at 2260 cm$^{-1}$ (band for isocyanate groups) in the IR spectrum. The content of blocked NCO groups in the mixture was 6.68%. The viscosity was 4000 mPas.

Example 2

Blocked Polyisocyanate Containing Acrylate Groups 15.48 g (0.133 val) hydroxyethyl acrylate, 69.72 g (0.275 val) cyclopentanone-2-carboxyethyl ester and 174.3 g (0.4 val) Desmodur® XP 2410, 86 mg zinc tetramethyl heptadionate and 128 mg 2,6-di-tert.-butyl-4-methylphenol were mixed together in a 500 ml three-neck flask with mechanical stirring and internal thermometer and stirred at 35° C. until the NCO content had dropped to 0%, which could be detected by a reduction in the band at 2260 cm$^{-1}$ (band for isocyanate groups) in the IR spectrum. The content of blocked NCO groups was 9.0% and the viscosity of the product thus obtained was 200,000 mPas.

Example 3

Blocked Polyisocyanate Containing Acrylate Groups 58.06 g (0.5 val) hydroxyethyl acrylate, 295.5 g (1.5 val) Desmodur® N3300 and 159.32 g (1.02 val) cyclopentanone-2-carboxyethyl ester in 128.22 g butyl acetate with 256 mg zinc acetyl acetone and 513 mg 2,6-di-tert.-butyl-4-methylphenol (solids content 80%) were placed in a 1000 ml three-neck flask and stirred at 35° C. until the NCO content had dropped to 0%, which could be detected by a reduction in the band at 2260 cm$^{-1}$ (band for isocyanate groups) in the IR spectrum. The content of blocked NCO groups in the product was 6.68%, the viscosity 2800 mPas.

Example 4

Blocked Polyisocyanate Containing Acrylate Groups 42.90 g (0.2 val) Baymicron® OXA WM 06 (214.5 g/val NCO) and 0.043 g zinc-2-ethyl hexanoate were mixed together in a 250 ml three-neck flask with reflux condenser and heated to 40° C. 31.86 g (0.204 mol) cyclopentanone-2-carboxyethyl ester (156.2 g/mol) were then added dropwise within 30 minutes and the mixture stirred for 14 hours at 40° C. so that free NCO groups could no longer be detected. 0.086 g triethylamine, 0.259 g 2,6-di-tert.-butyl-4-methylphenol and 11.6 g (0.1 val) hydroxyethyl acrylate were then added one after another with stirring, during which process slight evolution of gas was observed. A vacuum was applied at regular intervals to complete the reaction. After stirring for 10 hours the reaction was completed, which could be detected by a reduction in the band at 1825 cm$^{-1}$ (band for oxadiazine trione) in the IR spectrum. The content of blocked NCO groups in the product was 10.3% and the viscosity was over 100,000 mPas.

Example 5

Blocked Polyisocyanate Containing Acrylate Groups 42.90 g (0.2 val) Baymicron® OXA WM 06 (214.5 g/val NCO) and 0.043 g zinc acetyl acetonate were mixed in a 250 ml three-neck flask with reflux condenser and heated to 40° C. 23.90 g (0.153 val) cyclopentanone-2-carboxyethyl ester (156.2 g/mol) were then added dropwise within 30 minutes and the mixture stirred for 14 hours so that free NCO groups could no longer be detected. 0.084 g triethylamine, 0.253 g 2,6-di-tert.-butyl-4-methylphenol and 17.4 g (0.15 val) hydroxyethyl acrylate were then added one after another, during which process a moderate evolution of gas occurred. Stirring was continued for 14 h, during which time a vacuum was applied regularly to complete the reaction. After this time the reaction was completed, which could be detected by a reduction in the band at 1825 cm$^{-1}$ (band for oxadiazine trione) in the IR spectrum. The content of blocked NCO groups in the product obtained in this way was 7.9% and the viscosity was over 100,000 mPas.

Example 6

Blocked Polyisocyanate Containing Acrylate Groups 42.90 g (0.2 val) Baymicron® OXA 06 (214.5 g/val NCO) and 0.039 g zinc-2-ethyl hexanoate were mixed in a 250 ml three-neck flask with reflux condenser. At a maximum temperature of 40° C. 15.93 g (0.102 val) cyclopentanone-2-carboxyethyl ester (156.2 g/mol) were slowly added dropwise. The dropwise addition was completed after 30 minutes. After stirring for approximately 14 hours 0.078 g triethylamine and 0.233 g 2,6-di-tert.-butyl-4-methylphenol were added, followed by 23.2 g (0.2 val) hydroxyethyl acrylate. A moderate evolution of gas occurred. The reaction was completed by the regular application of vacuum. After stirring for 14 hours the reaction was completed, which could be detected by a reduction in the band at 1825 cm$^{-1}$ (band for oxadiazine trione) in the IR spectrum. The content of blocked NCO groups in the product was 5.41%. The viscosity was around 100,000 mPas.

Example 7

Blocked Polyisocyanate 104.6 g (1.0 val) Desmodur XP 2410 (Bayer AG, Leverkusen, 174.3 g/val) and 0.099 g zinc tetramethyl heptadionate were mixed for 10 minutes in a 500 ml three-neck flask with reflux condenser 93.7 g (1.0 val) cyclopentanone-2-carboxyethyl ester (156.2 g/val) were added dropwise at a temperature of 40° C. The dropwise addition was completed after 30 minutes. Stirring was continued at a temperature of 40° C. until the NCO content was 0%, which could be detected by a reduction in the band at 2260 cm$^{-1}$ (band for isocyanate groups) in the IR spectrum. The blocked NCO content is 12.71%, the viscosity was >100,000 mPas.

Example 8

Hydrophilised, Blocked Polyisocyanate with Acrylate and Methacrylate Groups 97.50 g (0.5 val) Desmodur N 3300 (195 g/val), 47.75 g of an adduct of glycidyl methacrylate and acrylic acid (1:1) with a hydroxyl value of 235 mg KOH/g, 5.90 g (0.05 val) hydroxypivalic acid (118 g/val), 0.19 g (2,6-di-tert.-butyl-4-methylphenol, 0.76 mg tin-2-ethyl hexanoate and 47.55 g methyl ethyl ketone were mixed in a 500 ml three-neck flask with reflux condenser. The mixture was reacted for 14 hours at a temperature of 60° C. until the NCO value was 0.1% below the theoretical value of 5.28%. 0.19 g zinc-2-ethyl hexanoate were then added at 65° C. and mixed for 10 minutes. 39.05 g (0.25 val) cyclopentanone-2-carboxyethyl ester (156.2 g/mol) were then slowly added dropwise. The dropwise addition was completed after 30 minutes. After stirring for 16 hours the NCO content was 0%, which could be detected by a reduction in the band at 2260 cm$^{-1}$ (band for isocyanate groups) in the IR spectrum. The product has a blocked NCO content of 4.41% and a viscosity of 4220 mPas.

Example 9

Blocked Polyisocyanate Containing Acrylate 59.10 g (0.3 val) Desmodur N 3300 (197 g/val), 0.103 g 2,6-di-tert.-butyl-4-methylphenol, 25.64 g butyl acetate and 0.051 g zinc-2-ethyl hexanoate were mixed for 10 minutes in a 250 ml three-neck flask with reflux condenser. At a maximum temperature of 40° C. 31.86 g (0.204 val) cyclopentanone-2-carboxyethyl ester (156.2 g/val) and 11.61 g (0.1 val) hydroxyethyl acrylate (116.12 g/val) were added dropwise. The dropwise addition was completed after approximately 30 minutes. Stirring was continued at a temperature of 40° C. until the batch had an NCO content of =%, which could be detected by a reduction in the band at 2260 cm$^{-1}$ (band for isocyanate groups) in the IR spectrum. The product has a solids content of 80% and a blocked NCO content of 6.68%. The viscosity was 4000 mPas.

Example 10

Coating Compounds and Coatings

In each case 5.52 g of the product obtained in example 9 were mixed with the quantities shown in the table. Desmophen® A870 is a hydroxyl group-containing polyacrylate, 70% in butyl acetate (Bayer AG, Leverkusen, DE). PETIA is an acrylated pentaerythritol with an OH content of 30 mg KOH/g (UCB GmbH, Kerpen, DE). Darocur® 1173 is a photoinitiator (Ciba Spezialitätenchemie GmbH, Lampertheim, DE). Zinc ethyl hexanoate was dissolved 50% in butyl acetate. All quantities stated in [g].

|      | Desmophen® A870 | PETIA | Darocur® 1173 | Zinc ethyl hexanoate, 50% | Butyl acetate |
|------|------|------|------|------|------|
| 10a  | —    | —    | 0.17 | 0.033 | 1.38 |
| 10b  | —    | 4.82 | 0.31 | 0.062 | 2.59 |
| 10c  | 5.76 | —    | 0.34 | 0.068 | 2.82 |
| 10d  | 4.61 | 0.96 | 0.33 | 0.067 | 2.77 |
| 10e  | 4.03 | 1.44 | 0.33 | 0.066 | 2.75 |

The coating compounds 10a) to 10e) were applied to glass plates with a bone-shaped 100 µm hand blade. All coatings were freed from solvent for 15 min in a drying cabinet at 50° C. and then cured with a UV radiator at 1500 mJ/cm² (CK radiator, 80 W/cm, IST Strahlentechnik, Nürtingen, DE). After 60 minutes at room temperature the pendulum hardness was determined according to König. All coatings were then cured for a further 20 minutes at 140° C. After 60 minutes at room temperature the pendulum hardness was again determined according to König.

|      | Pendulum hardness after UV | Pendulum hardness after UV and 140° C. |
|------|------|------|
| 10a  | 13 s  | 122 s |
| 10b  | 158 s | 186 s |
| 10c  | 11 s  | 154 s |
| 10d  | 23 s  | 160 s |
| 10e  | 28 s  | 162 s |

In the same way as in examples 10 a) to e), 10.60 g of the product obtained in example 1 were mixed in each case with the quantities shown in the table in [g].

|      | Desmophen® A870 | PETIA | Darocur® 1173 | Zinc ethyl hexanoate 50% | Butyl acetate |
|------|------|------|------|------|------|
| 10f  | —    | —    | 0.32 | 0.064 | 2.65 |
| 10g  | —    | 4.82 | 0.46 | 0.093 | 3.86 |
| 10h  | 5.76 | —    | 0.49 | 0.098 | 4.09 |
| 10i  | 4.61 | 0.96 | 0.49 | 0.097 | 4.04 |
| 10k  | 4.03 | 1.44 | 0.48 | 0.096 | 4.02 |

The coating compounds 10 f) to 10k) were applied and cured in the same way as 10a) to 10e).

|      | Pendulum hardness after UV | Pendulum hardness after UV and 140° C. |
|------|------|------|
| 10f  | 82 s  | 188 s |
| 10g  | 167 s | 190 s |
| 10h  | 35 s  | 180 s |
| 10i  | 69 s  | 151 s |
| 10k  | 85 s  | 162 s |

In the same way as in examples 10 a) to e), 16.52 g of the product obtained in example 7 were mixed in each case with the quantities shown in the table in [g]. Laromer® PE 44F is a polyester acrylate with an OH content of 77 mg KOH/g (BASF AG, Ludwigshafen, DE). Ebecryl® 600 is an aromatic epoxy acrylate with an OH content of 225 mg KOH/g (UCB GmbH, Kerpen, DE).

|      | A = Laromer® PE44F  B = Ebecryl® 600  C = Desmophen® A870 | PETIA | Darocur® 1173 | Zinc ethyl hexanoate 50% | Butyl acetate |
|------|------|------|------|------|------|
| 10l  | 35.32 (A) | —    | 1.55 | 0.310 | 2.65 |
| 10m  | 12.41 (B) | —    | 0.87 | 0.174 | 3.86 |
| 10n  | 28.80 (C) | 11.33 | 1.10 | 0.220 | 4.09 |

The coating compounds 10l) to 10 n) were applied and cured in the same way as 10 a) to 10 e).

|      | Pendulum hardness after UV | Pendulum hardness after UV and 140° C. |
|------|------|------|
| 10l  | 23 s | 45 s |
| 10m  | 16 s | 63 s |
| 10n  | 59 s | 76 s |

It was possible to show in this way that the coating compounds cure with two independent mechanisms. The expected requirements in paint technology are satisfied with this system, which reacts without releasing substances.

Example 11

Coating Compound and Coating 62.7 g of the polyisocyanate according to example 3 were mixed intensively with 60.7 g of the hydroxy-functional polyester Desmophen® T XP 2374 (80% in butyl acetate/isobutanol 9:1, Bayer A G, Leverkusen, DE), 28.6 g butyl acetate, 2.0 g Irgacure® 184 (photoinitiator, Ciba Spezialitätenchemie GmbH, Lampertheim, DE), 1.0 g Lucirin® TPO (photoinitiator, BASF A G, Ludwigshafen, DE) and 0.5 g Byk® 306 (flow control agent, Byk-Chemie, Wesel, DE). This coating compound was applied to an aluminium sheet using a spiral blade with a resulting dry film thickness of 50 µm. Solvent was allowed to evaporate for 10 minutes at 80° C., then the coating was UV cured at 1500 mJ/cm² (1 CK radiator 80 W/cm) and then heat cured for 20 minutes at 140° C. After cooling, the sheet could be bent around a mandrel with a diameter of 1 cm without the coating tearing.

Example 12

Production of a Dispersion or a Powder Slurry

A mixture of 100 g Bayhydrol® VP LS 2235 (hydroxyl group-containing polyacrylate dispersion, solids content approx. 45%, hydroxyl content 3.3%, Bayer AG, Leverkusen, DE), 100 g Bayhydrol® UV VP LS 2282 (urethane acrylate dispersion, solids content approx. 39%, free from OH groups, Bayer AG, Leverkusen, DE), 0.3 g ethyl diisopropylamine, 80 g water and 46.8 g of the polyisocyanate in example 8 were introduced into a 500 ml three-neck flask with mechanical stirrer one after another in this sequence with intensive stirring. After stirring for 30 min methyl ethyl ketone (co-solvent) was distilled off from the dispersion at 40° C. and under reduced pressure of 23 mbar. 3.2 g Irgacure® 500 (photoinitiator, Ciba Spezialitäitenchemie GmbH, Lampertheim, DE) were then stirred in. The resulting coating compound had a solids content of 40.1% and a discharge viscosity of 18 s in a DIN4 beaker.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Blocked organic polyisocyanates comprising at least one unsaturated functional group that is capable of copolymerizing with ethylene-unsaturated compounds when exposed to actinic radiation, the polyisocyanates further comprising structural units having the formula (1)

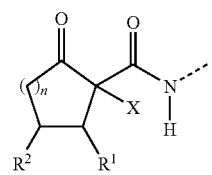
(1)

in which

X is an electron-attracting group, $R^1$, and $R^2$ are independently selected from the group consisting of a hydrogen atom, a saturated or unsaturated aliphatic or cycloaliphatic radical, an optionally substituted aromatic or araliphatic radical and each radical contains up to 12 carbon atoms and optionally up to 3 heteroatoms of the elements oxygen, sulfur, or nitrogen and are optionally substituted by halogen atoms; and n is an integer of from 0 to 5.

2. The polyisocyanates according to claim 1, wherein the electron-attracting group X is an ester, sulfoxide, sulfo, nitro, phosphonate, nitrile, isonitrile or carbonyl group.

3. A process for producing the polyisocyanates according to claim 1, comprising reacting A1) one or more organic polyisocyanates together with A2) one or more compounds comprising at least one isocyanate-reactive group and at least one group that is capable of copolymerizing with ethylene-unsaturated compounds when exposed to actinic radiation, A3) optionally other isocyanate-reactive compounds and A4) blocking agents containing at least one CH-acid cyclic ketone having the general formula (2),

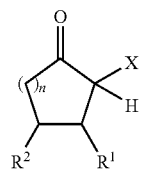
(2)

in which

X is an electron-attracting group, $R^1$, and $R^2$ are independently selected from the group consisting of a hydrogen atom, a saturated or unsaturated aliphatic or cycloaliphatic radical, an optionally substituted aromatic or araliphatic radical and each radical contains up to 12 carbon atoms and optionally up to 3 heteroatoms of the elements oxygen, sulfur, nitrogen and are optionally substituted by halogen atoms and n is an integer of from 0 to 5, A5) in the presence of one or more catalysts and A6) optionally auxiliary substances and additives and A7) optionally solvents.

4. A method of making paints, coatings, sizes, adhesives and moulded articles comprising combining the polyisocyanate according to claim 1 with one or more compounds containing isocyanate-reactive groups.

5. Coating compositions comprising

B1) one or more polyisocyanates according to claim 1 and/or

B2) one or more blocked organic polyisocyanates displaying structural units having formula (1)

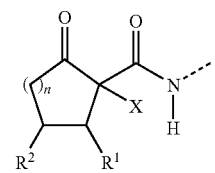
(1)

in which

X is an electron-attracting group, $R^1$, and $R^2$ are independently selected from the group consisting of a hydrogen atom, a saturated or unsaturated aliphatic or cycloaliphatic radical, an optionally substituted aromatic or araliphatic radical and each contain up to 12 carbon atoms and optionally up to 3 heteroatoms of the elements oxygen, sulfur, nitrogen and are optionally substituted by halogen atoms and n is an integer of from 0 to 5, B3) one or more compounds comprising at least one isocyanate-reactive group and optionally containing one or more functional groups that are capable of copolymerizing with ethylene-unsaturated compounds when exposed to actinic radiation, B4) optionally compounds comprising functional groups that are capable of copolymerizing with ethylene-unsaturated compounds when exposed to actinic radiation and that do not contain NCO groups or NCO-reactive groups, B5) optionally catalysts and B6) optionally auxiliary substances and additives B7) optionally products from reactions of components B1) to B6) with one another with the proviso that when compounds of B2 are combined with compounds of B3, in the absence of compounds of B1, at least one of the compounds of B3 will contain a functional group that is capable of copolymerizing with ethylene-unsaturated compounds when exposed to actinic radiation.

6. A process for producing the coating compositions according to claim 5 comprising mixing components B1) to B6).

7. Coatings obtained from coating compositions according to claim 5.

8. Substrates coated with coatings according to claim 7.

9. The process of claim 3, wherein the organic polyisocyanates of A1) are one or more selected from the group consisting of 1,4-diisocyanatobutane, 1,5-diisocyanatopentane, 1,6-diisocyanatohexane, 2-methyl-1,5-diisocyanato-pentane, 1,5-diisocyanato-2,2-dimethyl pentane, 2,2,4-trimethyl-1,6-diisocyanato-hexane, 2,4,4-trimethyl-1,6-diisocyanatohexane, 1,10-diisocyanatodecane, 1,3- diisocyanatocyclohexane, 1,4-diisocyanatocyclohexane, 1,3-bis-(isocyanato-methyl) cyclohexane, 1,4-bis-(isocyanatomethyl) cyclohexane, isophorone diisocyanate, 4,4'-diisocyanato-dicyclohexyl methane, 4-isocyanatomethyl-1,8-octane diisocyanate, ω,ω'-diisocyanato-1,3-dimethyl cyclohexane, 1-isocyanato-1-methyl-3-isocyanato-methyl cyclohexane, 1-isocyanato-1-methyl-4-isocyanatomethyl cyclohexane, bis-(isocyanatomethyl) norbornane, 1,5-naphthalene diisocyanate, 1,3-bis-(2-isocyanatoprop-2-yl) benzene, 1,4-bis-(2-isocyanatoprop-2-yl) benzene, 2,4-diisocyanatotoluene, 2,6-diisocyanatotoluene, 2,4-diisocyanatotoluene, 2,4'-diisocyanatodiphenyl methane, 4,4'-diisocyanato-diphenyl methane, 1,5-diisocyanatonaphthaline, and 1,3-bis(isocyanatomethyl) benzene.

10. The process of claim 3, wherein the compounds of A2) are one or more selected from the group consisting of acrylates, methacrytates, maleinates, fumarates, maleimides, and acrylamides.

11. The process of claim 3, wherein the compounds of A2) are one or more selected from the group consisting of 2-hydroxyethyl methacrylate; 2-hydroxyethyl acrylate; polyethylene oxide monomethacrylates; polyethylene oxide monoacrylates; polypropylene oxide monomethacrylates; polypropylene oxide monoacrylates; polyalkylene oxide monomethacrylates; polyalkylene oxide monoacrylates; poly (ε-caprolactone) monomethacrylates; poly (ε-caprolactone) monoacrylates; 2-hydroxypropyl methacrylate; 2-hydroxypropyl acrylate; 4-hydroxybutyl methacrylate; 4-hydroxybutyl acrylate; 3-hydroxy-2,2-dimethyl propyl methacrylate; 3-hydroxy-2,2-dimethyl propyl acrylate; the hydroxy-functional monoacrylates, diacrylates or tetraacrylates of polyhydric alcohols selected from trimethylol propane, glycerol, pentaerythritol, dipentaerythritol, ethoxylated, propoxylated, alkoxylated trimethylol propane, alkoxylated glycerol, alkoxylated pentaerythritol, and alkoxylated dipentaerythritol; the reaction products of acrylic acid or methacrylic acid with glycidyl (meth)acrylate; and the reaction products of acrylic acid or methacrylic acid with the glycidyl ester of versatic acid.

12. The process of claim 3, wherein the CH-acid cyclic ketone of A4) is one or more selected from the group consisting of cyclopentanone-2-carboxymethyl ester, cyclopentanone-2-carboxyethyl ester, cyclopentanone-2-carboxylic acid nitrile, cyclohexanone-2-carboxylmethyl ester, cyclohexanone-2-carboxyethyl ester, and cyclopentanone-2-carbonyl methane.

13. The process of claim 3, wherein the catalyst A5) is one or more selected from the group consisting of sodium carbonate, trisodium phosphate, 1,4-diazabicyclo[2.2.2]octane, potassium carbonate, and zinc-2-ethyl hexanoate.

14. A method of thermoforming comprising
    forming a film comprising the coating compositions of claim 5;
    curing the film by exposure to actinic radiation to form an elastic layer; and
    drawing the elastic layer over a moulded part at a temperature at which crosslinking occurs in the elastic layer.

* * * * *